US012160359B2

(12) United States Patent
Fujimoto

(10) Patent No.: US 12,160,359 B2
(45) Date of Patent: Dec. 3, 2024

(54) SERVER DELAY CONTROL DEVICE, SERVER DELAY CONTROL METHOD, AND PROGRAM

(71) Applicant: Nippon Telegraph and Telephone Corporation, Tokyo (JP)

(72) Inventor: Kei Fujimoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 95 days.

(21) Appl. No.: 17/787,782

(22) PCT Filed: Dec. 23, 2019

(86) PCT No.: PCT/JP2019/050426
§ 371 (c)(1),
(2) Date: Jun. 21, 2022

(87) PCT Pub. No.: WO2021/130828
PCT Pub. Date: Jul. 1, 2021

(65) Prior Publication Data
US 2023/0029932 A1 Feb. 2, 2023

(51) Int. Cl.
*H04L 43/0852* (2022.01)
(52) U.S. Cl.
CPC .............. *H04L 43/0852* (2013.01)
(58) Field of Classification Search
CPC . H04L 43/0852; H04L 41/0895; H04L 41/40; H04L 43/103; G06F 2009/45595;
(Continued)

(56) References Cited

U.S. PATENT DOCUMENTS 5,617,537 A * 4/1997 Yamada ................. G06F 15/17
709/201
8,081,645 B2 * 12/2011 Musoll ................. H04L 47/621
709/231
(Continued)

FOREIGN PATENT DOCUMENTS

JP 2015-197874 11/2015
JP 2018-032156 3/2018

OTHER PUBLICATIONS

[No Author Listed] [online], "LWN.net, Revision 0.2.1," lwn.net, Feb. 16, 2002, retrieved on Apr. 14, 2022, retrieved from URL <http://lwn.net/2002/0321/a/napi-howto.php3>, 10 pages.
(Continued)

*Primary Examiner* — Greg C Bengzon
(74) *Attorney, Agent, or Firm* — Fish & Richardson P.C.

(57) ABSTRACT

Provided is a server delay control device deployed in a kernel of an OS of a server. The OS includes: the kernel; a ring buffer managed by the kernel, in a memory space in which the server deploys the OS; and a poll list in which packet arrival information indicative of the presence of a packet in the ring buffer is to be registered. The server delay control device spawns a thread configured to monitor a packet arrival according to a polling model. The thread includes: a packet arrival monitoring part configured to monitor whether the packet arrival information has been registered in the poll list, and a packet dequeuer configured to, when the packet arrival information has been registered in the poll list, dequeue the packet from the ring buffer on the basis of the packet arrival information.

12 Claims, 10 Drawing Sheets

(58) Field of Classification Search
CPC ............. G06F 9/45545; G06F 9/45558; G06F 9/4812; G06F 9/542; G06F 9/544; G06F 9/545; G06F 9/546
USPC ........................................................ 709/224
See application file for complete search history.

(56) References Cited

U.S. PATENT DOCUMENTS

| | | | | |
|---|---|---|---|---|
| 10,678,724 | B1* | 6/2020 | ChoFleming | H04L 67/60 |
| 11,029,958 | B1* | 6/2021 | Zhang | G06F 9/3016 |
| 2002/0156927 | A1* | 10/2002 | Boucher | H04L 69/16 |
| | | | | 719/321 |
| 2005/0108518 | A1* | 5/2005 | Pandya | H04L 63/20 |
| | | | | 713/153 |
| 2018/0123984 | A1* | 5/2018 | Sharma | H04L 49/9047 |
| 2019/0391940 | A1* | 12/2019 | Vasudevan | G06F 3/0613 |
| 2020/0089529 | A1* | 3/2020 | Brownsword | G06F 16/1805 |
| 2020/0183732 | A1* | 6/2020 | Cornett | H04L 49/901 |
| 2020/0310797 | A1* | 10/2020 | Corbal | G06F 15/8007 |
| 2020/0409709 | A1* | 12/2020 | ChoFleming | G06F 9/44505 |
| 2021/0200540 | A1* | 7/2021 | Chofleming | G06F 9/3001 |
| 2021/0209047 | A1* | 7/2021 | Kim | G06F 13/4027 |
| 2022/0100680 | A1* | 3/2022 | Chrysos | G06F 13/4027 |
| 2023/0028832 | A1* | 1/2023 | Fujimoto | G06F 9/54 |

OTHER PUBLICATIONS

[No Author Listed] [online], "Soft Patch Panel—DPDK resources management framework (v19.08—Documentation)," spp-19.08.zip, git.dpdk.org, Nov. 4, 2019, retrieved from URL <http://git.dpdk.org/apps/spp/tag/?h=v19.08>, 211 pages.

Ben-Yehuda et al., "Adding Advanced Storage Controller Functionality via Low-Overhead Virtualization," USENIX, The Advanced Computing Systems Association, Apr. 1-8, 2017.

Liu et al., "Virtualization polling engine (VPE) using dedicated CPU cores to accelerate I/O virtualization," Proceedings of the 23rd International Conference on Supercomputing, New York, New York, USA, Jun. 8-12, 2009, 225-234.

Shalev et al., "IsoStack—Highly Efficient Network Processing on Dedicated Cores," USENIX, The Advanced Computing Systems Association, May 1-14, 2010.

* cited by examiner

SERVER DELAY CONTROL DEVICE, SERVER DELAY CONTROL METHOD, AND PROGRAM

CROSS-REFERENCE TO RELATED APPLICATIONS

This is a National Stage Application of PCT Application No. PCT/JP2019/050426, filed on Dec. 23, 2019. The disclosure of the prior application is considered part of the disclosure of this application, and is incorporated in its entirety into this application.

TECHNICAL FIELD

The present invention relates to a server delay control device, a server delay control method, and a program.

BACKGROUND ART

Against the background of advances in virtualization technology achieved through NFV (Network Functions Virtualization), systems are being constructed and operated on a per-service basis. Also, a mode called SFC (Service Function Chaining) is becoming mainstream, in which, based on the above-described mode of constructing a system on a per-service basis, service functions are divided into units of reusable modules and are operated on independent virtual machine (VM: Virtual Machine, container, etc.) environments, and thereby the service functions are used as needed in a manner as if they are components, and the operability is improved.

A hypervisor environment consisting of Linux (registered trademark) and a KVM (kernel-based virtual machine) is known as a technology for forming a virtual machine. In this environment, a Host OS (an OS installed on a physical server is called a "Host OS") in which a KVM module is incorporated operates as a hypervisor in a memory area called kernel space, which is different from user spaces. In this environment, the virtual machine operates in a user space, and a Guest OS (an OS installed on a virtual machine is called a Guest OS) operates in the virtual machine.

Unlike the physical server in which the Host OS operates, in the virtual machine in which the Guest OS operates, all hardware including network devices (such as Ethernet card devices) is controlled via registers, which is needed for interrupt processing from the HW (hardware) to the Guest OS and for writing from the Guest OS to the hardware. In such register-based control, the performance is generally lower than that in the Host OS environment because the notifications and processing that would have been executed by physical hardware are emulated virtually by software.

To deal with this degraded performance, there is a technique of reducing HW emulation from a Guest OS, in particular, for a Host OS and an external process present outside of the virtual machine of the Guest OS, to improve performance and versatility of communication using a high-speed and consistent interface. As such a technique, a device abstraction technique called virtio, that is, a para-virtualization technique, has been developed and already been applied to many general-purpose OSes, such as FreeBSD (trade name) as well as Linux (trade name) and currently put into practical use.

In virtio, regarding data input/output such as console input/output, file input/output, and network communication, as a unidirectional data transfer transport, data exchange and queue operations using a queue designed with a ring buffer are defined. By using the virtio queue specifications and preparing queues whose number and sizes are suitable for each device when the Guest OS starts up, communication between the Guest OS and the outside of its virtual machine can be realized merely through operations on the queues without performing hardware emulation.

Packet Transfer in Interrupt Model (Example of General-Purpose VM Configuration)

PTL 1 describes a virtual communication channel construction system in which a Guest OS operating in a virtual machine constructs a dedicated virtual communication channel for communication with an external process that exists outside the virtual machine. The technique described in PTL 1 speeds up packet transfer processing by reducing the number of virtio-net related memory copy operations between the Host OS and the Guest OS connected by virtio.

FIG. 7 is an explanatory diagram illustrating packet transfer operations performed according to the interrupt model in a server virtualization environment which is configured with a general-purpose Linux kernel (registered trademark) and a VM.

HW 10 includes a network interface card (NIC) 11 (a physical NIC) (an interface part), and performs communication for data transmission and reception with a packet processing APL (Application) 1 in a user space 60 via a virtual communication channel constructed by a Host OS 20, a KVM 30, which is a hypervisor that constructs virtual machines, virtual machines (VM 1, VM 2) 40, and a Guest OS 50. In the following description, as indicated by the thick arrows in FIG. 7, the data flow in which packet processing APL 1 receives a packet from HW 10 is referred to as "Rx-side reception", and the data flow in which packet processing APL 1 transmits a packet to HW 10 is called "Tx-side transmission".

Host OS 20 includes a kernel 21, a Ring Buffer 22, and a Driver 23. Kernel 21 includes a vhost-net module 221, which is a kernel thread, a TAP device 222, and a virtual switch (br) 223.

TAP device 222 is a kernel device of a virtual network and is supported by software. Virtual machine (VM 1) 40 is configured such that Guest OS 50 and Host OS 20 can communicate via virtual switch (br) 223 created in a virtual bridge. TAP device 222 is a device connected to a Guest OS 50's virtual NIC (vNIC) created in this virtual bridge.

Host OS 20 copies the configuration information (sizes of shared buffer queues, number of queues, identifiers, information on start addresses for accessing the ring buffers, etc.) constructed in the virtual machine of Guest OS 50 to vhost-net module 221, and constructs, inside Host OS 20, information on the endpoint on the virtual machine side. This vhost-net module is a kernel-level back end for virtio networking, and can reduce virtualization overhead by moving virtio packet processing tasks from the user area (user space) to vhost-net module 221 of kernel 21.

Guest OSes 50 include a Guest OS (Guest 1) installed on the virtual machine (VM 1) and a Guest OS (Guest 2) installed on the virtual machine (VM 2), and Guest OSes 50 (Guest 1, Guest 2) operate in virtual machines (VM 1, VM 2) 40. Taking Guest 1 as an example of Guest OSes 50, Guest OS 50 (Guest 1) includes a kernel 51, a Ring Buffer 52, and a Driver 53, and Driver 53 includes a virtio-driver 531.

Specifically, as PCI (Peripheral Component Interconnect) devices, there are respective virtio devices for console input/output, file input/output, and network communication in the virtual machine (the device for the console, which is called virtio-console, the device for file input/output, which is called virtio-blk, and the device for the network, which is called virtio-net, and their corresponding drivers included in the OS are each defined with a virtio queue). When Guest OS starts up, two data transfer endpoints (transmission/reception endpoints) for each device are created between Guest OS and the counterpart side, and a parent-child relationship for data transmission and reception is constructed. In many cases, the parent-child relationship is formed between the virtual machine side (child side) and the Guest OS (parent side).

The child side exists as configuration information of each device in the virtual machine, and requests the size of each data area, the number of combinations of needed endpoints, and the type of the device to the parent side. In accordance with the request from the child side, the parent side allocates and maintains memory for a shared buffer queue for accumulating and transferring the needed amount of data, and sends the address of the memory as a response to the child side so that the child side can access it. Operations of the shared buffer queue necessary for data transfer are uniformly defined in virtio, and are performed in a state where both the parent side and the child side have agreed on the definition. Furthermore, the size of the shared buffer queue also has been agreed on by both sides (i.e., it is determined for each device). As a result, it is possible to operate the queue shared by both the parent side and the child side by merely communicating the address to the child side.

As each shared buffer queue prepared in virtio is prepared for one direction, for example, a virtual network device called a virtio-net device is constituted by three Ring Buffers 52 for transmission, reception, and control. Communication between the parent and the child is realized by writing to the shared buffer queue and performing a buffer update notification. That is, after writing to the Ring Buffer 52, a notification is made to the counterpart. Upon receipt of the notification, the counterpart side uses common operations of virtio to check which shared buffer queue contains the new data and check how much the new data is, and retrieves a new buffer area. As a result, transfer of data from the parent to the child or from the child to the parent is achieved.

As described above, by sharing Ring Buffer 52 for mutual data exchange and the operation method (used in common in virtio) for each ring buffer between the parent and the child, communication between Guest OS 50 and the outside, which does not require hardware emulation, is realized. This makes it possible to realize transmission and reception of data between Guest OS 50 and the outside at a high speed compared to the conventional hardware emulations.

If Guest OS 50 in the virtual machine communicates with the outside, the child side needs to connect to the outside and transmit and receive data as a relay between the outside and the parent side. For example, communication between Guest OS 50 and Host OS 20 is one example. Here, if the outside is Host OS 20, two patterns are present as existing communication methods.

In the first method (hereinafter referred to as "external communication method 1"), a child-side endpoint is constructed in the virtual machine, and a communication between Guest OS 50 and Host OS 20 is connected in the virtual machine to a communication endpoint (usually called a "TAP/TUN device") provided by Host OS 20. This connection constructs a connection as follows and thus realizes communication from Guest OS 50 to Host OS 20.

In this case, Guest OS 50 operates in a memory area that is a user space having privileges different from a memory area called kernel space, in which the TAP driver and Host OS 20 operate. For this reason, at least one memory copy occurs in the communication from Guest OS 50 to Host OS 20.

In the second method (hereinafter referred to as "external communication method 2"), a technology called vhost-net exists as means for solving this. According to the vhost-net, parent-side configuration information (sizes of shared buffer queues, number of queues, identifiers, information on start addresses for accessing ring buffers, etc.) once constructed in the virtual machine is copied into the vhost-net module 221 inside the Host OS 20, and information on the endpoints of the child side is constructed inside the host. Vhost-net is a technology that enables operations on shared buffer queues to be carried out directly between Guest OS 50 and Host OS 20 by this construction. As a result, the number of copy operations is substantially zero, and data transfer can be realized at a higher speed than the external communication method 1 because the number of copy operations is less by one compared to virtio-net.

In this manner, in the case of Host OS 20 and Guest OS 50 connected by virtio, packet transfer processing can be sped up by reducing the number of virtio-net related memory copy operations.

Note that in kernel v4.10 (February 2017-) and later, the specifications of the TAP interface have changed, and packets inserted from the TAP device are completed in the same context as the processing of copying packets to the TAP device. Accordingly, software interrupts (softIRQ) no longer occur.

Packet Transfer in Polling Model (Example of DPDK)

The method of connecting and coordinating virtual machines is called Inter-VM Communication, and in large-scale environments such as data centers, virtual switches have been typically used in connections between VMs. However, since it is a method with a large communication delay, faster methods have been newly proposed. For example, a method of using special hardware called SR-IOV (Single Root I/O Virtualization), a method performed with software using Intel DPDK (Intel Data Plane Development Kit) (hereinafter referred to as DPDK), which is a high-speed packet processing library, and the like have been proposed (see NPL 1).

DPDK is a framework for controlling an NIC (Network Interface Card), which was conventionally controlled by a Linux kernel (registered trademark), in a user space. The biggest difference from the processing in the Linux kernel is that it has a polling-based reception mechanism called PMD (Pull Mode Driver). Normally, with a Linux kernel, an interrupt occurs upon arrival of data on the NIC, and this interrupt triggers the execution of reception processing. On the other hand, in a PMD, a dedicated thread continuously checks arrival of data and performs reception processing. High-speed packet processing can be performed by eliminating the overhead of context switching, interrupts, and the like. DPDK significantly increases packet processing performance and throughput, making it possible to ensure more time for processing of data plane applications.

DPDK exclusively uses computer resources such as a CPU (Central Processing Unit) and an NIC. For this reason, it is difficult to apply it to an application, such as SFC, that flexibly reconnects in units of modules. There is SPP (Soft Patch Panel), which is an application for mitigating this. SPP omits packet copy operations in the virtualization layer by adopting a configuration in which shared memory is prepared between VMs and each VM can directly reference the same memory space. Also, DPDK is used to speed up exchanging packets between a physical NIC and the shared memory. In SPP, the input destination and output destination of a packet can be changed by software by controlling the reference destination for the memory exchange by each VM. Through this process, SPP realizes dynamic connection switching between VMs, and between a VM and a physical NIC.

PTL 2 describes a virtual machine connection control system that causes a plurality of virtual machines to operate. PTL2 describes a server delay control system including: an SPP server having an SPP (Soft Patch Panel) that manages resources including the virtual machines; and a GUI terminal that, in cooperation with the SPP server, performs, through GUI (Graphical User Interface) operations, resource allocation and route setting for connecting the virtual machines. The technology described in PTL 2 provides a virtual machine connection control system that abstracts the operations of the SPP and allows operations of the SPP to be performed intuitively through a GUI.

FIG. 8 is an explanatory diagram illustrating packet transfer performed based on a polling model in an OvS-DPDK (Open vSwitch with DPDK) configuration. The same components as those in FIG. 7 are denoted by the same reference signs thereas, and descriptions of overlapping portions are omitted.

As illustrated in FIG. 8, a Host OS 20 includes an OvS-DPDK 70, which is software for packet processing; and OvS-DPDK 70 includes a vhost-user 71, which is a functional part for connecting to a virtual machine (here, VM 1), and a dpdk (PMD) 72, which is a functional part for connecting to an NIC (DPDK) 11 (physical NIC).

Moreover, a packet processing APL 1A includes a dpdk (PMD) 2, which is a functional part that performs polling in the Guest OS 50 section. That is, packet processing APL 1A is an APL obtained by modifying packet processing APL 1 illustrated in FIG. 7 by equipping packet processing APL 1 with dpdk (PMD) 2.

As an extension of DPDK, packet transfer performed based on the polling model enables a routing operation using a GUI in an SPP that rapidly performs packet copy operations between Host OS 20 and Guest OS 50 and between Guest OSes 50 via shared memory with zero-copy operation.

Rx-Side Packet Processing by New API (NAPI)

FIG. 9 is a schematic diagram of Rx-side packet processing by New API (NAPI) implemented in Linux kernel 2.5/2.6 and later versions (see NPL 2). The same components as those in FIG. 7 are denoted by the same reference signs thereas.

As illustrated in FIG. 9, New API (NAPI) executes, on a server including an OS 70 (e.g., a Host OS), a packet processing APL 1 deployed in a user space 60, which can be used by a user, and performs packet transfer between an NIC 11 of HW 10, connected to the OS 70, and packet processing APL 1.

OS 70 has a kernel 71, a ring buffer 72, and a driver 73, and kernel 71 has a protocol processor 74.

Kernel 71 has the function of the core part of OS 70 (e.g., Host OS). Kernel 71 monitors hardware and manages execution status of programs, on a per-process basis. Here, kernel 71 responds to requests from packet processing APL 1 and conveys requests from HW 10 to packet processing APL 1. In response to a request from packet processing APL 1, kernel 71 performs processing via a system call (a "user program operating in a non-privileged mode" requests processing to a "kernel operating in a privileged mode").

Kernel 71 transmits packets to packet processing APL 1 via a Socket 75. Kernel 71 receives packets from packet processing APL 1 via Socket 75.

Ring buffer 72 is managed by kernel 71 and is in the memory space in the server. Ring buffer 72 is a constant-sized buffer that stores messages output by kernel 71 as logs, and is overwritten from the beginning when the messages exceed a maximum size.

Driver 73 is a device driver for monitoring hardware in kernel 71. Incidentally, driver 73 depends on kernel 71, and is replaced if the source code of the created (built) kernel is modified. In this case, a corresponding driver source code is to be obtained and rebuilding is to be performed on the OS that will use the driver, to create the driver.

Protocol processor 74 performs protocol processing of L2 (data link layer)/L3 (network layer)/L4 (transport layer), which are defined by the OSI (Open Systems Interconnection) reference model.

Socket 75 is an interface for kernel 71 to perform inter-process communication. Socket 75 has a socket buffer and does not frequently generate data copy processing. The flow up to the establishment of communication via Socket 75 is as follows. 1. The server side creates a socket file according to which the server side accepts clients. 2. Name the acceptance socket file. 3. Create a socket queue. 4. Accept a first connection from a client that is in the socket queue. 5. The client side creates a socket file. 6. The client side sends a connection request to the server. 7. The server side creates a connection socket file separately from the acceptance socket file. As a result of establishing communication, packet processing APL 1 becomes able to call a system call, such as read( ) and write( ), to kernel 71.

In the above configuration, kernel 71 receives a notification of a packet arrival from NIC 11 via a hardware interrupt (hardIRQ) and schedules a software interrupt (softIRQ) for packet processing (see FIG. 10).

Above-described New API (NAPI), implemented in Linux kernel 2.5/2.6 and later versions, processes, upon arrival of a packet, the packet by a software interrupt (softIRQ) after the hardware interrupt (hardIRQ). As illustrated in FIG. 9, in packet transfer based on the interrupt model, a packet is transferred through interrupt processing (see reference sign c in FIG. 9), and therefore a wait due to the interrupt processing occurs and the delay in packet transfer increases.

An overview of Rx-side packet processing of NAPI will be described below.

Configuration of Rx-Side Packet Processing by New API (NAPI)

FIG. 10 is an explanatory diagram for explaining an overview of Rx-side packet processing by New API (NAPI) at the part surrounded by the dashed line in FIG. 9.

Device Driver

As illustrated in FIG. 10, components deployed in the device driver include; NIC 11, which is a network interface card (physical NIC); hardIRQ 81, which is a handler called due to the generation of a processing request from NIC 11 to perform the requested processing (hardware interrupt); and netif_rx 82, which is a processing function part for the hardware interrupt.

Networking Layer

The components deployed in the networking layer include: softIRQ 83, which is a handler called due to the generation of a processing request from netif_rx 82 to perform the requested processing (software interrupt); and do_softirq 84, which is a control function part that performs the actual part of the software interrupt (softIRQ). The components deployed in the networking layer further include: net_rx_action 85, which is a packet processing part that is executed upon reception of the software interrupt (softIRQ); a poll_list 86, in which information on a net device (net device), indicative of which device the hardware interrupt from NIC 11 comes from, is registered; netif_receive_skb 87, which creates a sk_buff structure (structure for enabling the kernel 71 to know the structure of the packet); and a ring buffer 72.

Protocol Layer

The components deployed in the protocol layer include: ip_rcv 88, arp_rcv 89, and the like, which are packet processing function parts.

The above-described netif_rx 82, do_softirq 84, net_rx_action 85, netif_receive_skb 87, ip_rcv 88, and arp_rcv 89 are program components (function names) used for packet processing in kernel 71.

Rx-Side Packet Processing Operation by New API (NAPI)

The arrows (reference signs) d to o in FIG. 10 indicate the flow of the Rx-side packet processing.

A hardware function part 11*a* of NIC 11 (hereinafter referred to as "NIC 11") is configured to, upon reception of a packet in a frame (or upon reception of a frame) from a remote device, copy the arrived packet to ring buffer 72 by a Direct Memory Access (DMA) transfer (see reference sign d in FIG. 10), without using the CPU. Ring buffer 72 is managed by kernel 71 in a memory space in the server (see FIG. 9).

However, kernel 71 cannot notice the arrived packet simply by NIC 11 copying the arrived packet to ring buffer 72. When the packet arrives, NIC 11 raises a hardware interrupt (hardIRQ) to hardIRQ 81 (see reference sign e in FIG. 10) and netif_rx 82 performs the processing described below, which causes kernel 71 to notice the packet. Incidentally, the notation of an ellipse surrounding hardIRQ 81, illustrated in FIG. 10, represents a handler rather than a functional part.

netif_rx 82 has a function of performing actual processing. When hardIRQ 81 (handler) has started execution (see reference sign f in FIG. 10), netif_rx 82 stores, into poll_list 86, information on a net device (net_device), which is one piece of information of the content of the hardware interrupt (hardIRQ) and which indicates which device the hardware interrupt from NIC 11 comes from, and registers, in poll_list 86, a dequeuing operation (referencing the content of a packet pooled in a buffer and taking into account the processing to be performed next, removing the corresponding queue entry from the buffer) (see reference sign g in FIG. 10). Specifically, netif_rx 82, in response to the packet having been loaded into ring buffer 72, registers a dequeuing operation in poll_list 86 (see reference sign g in FIG. 10) using a driver of NIC 11. As a result, information on the dequeuing operation due to the packet having been loaded into ring buffer 72 is registered into poll_list 86.

In this way, in the device driver illustrated in FIG. 10, upon reception of a packet, NIC 11 copies the arrived packet to ring buffer 72 by a DMA transfer. In addition, NIC 11 raises hardIRQ 81 (handler), and netif_rx 82 registers net_device in poll_list 86 and schedules a software interrupt (softIRQ).

With the above operations, the hardware interrupt processing in the device driver illustrated in FIG. 10 ends.

netif_rx 82 passes up, to softIRQ 83 (handler) via a software interrupt (softIRQ) (see reference sign h in FIG. 10), a request for dequeuing data stored in ring buffer 72 using information (specifically, a pointer) enqueued in the queue stacked in poll_list 86, thereby to communicate the request to notify do_softirq 84, which is a software interrupt control function part (see reference sign i in FIG. 10).

do_softirq 84 is a software interrupt control function part that defines functions of the software interrupt (there are various types of packet processing; the interrupt processing is one of them; it defines the interrupt processing). Based on the definition, do_softirq 84 notifies net_rx_action 85, which performs actual software interrupt processing, of a request for processing the current (corresponding) software interrupt (see reference sign j in FIG. 10).

When the order of the softIRQ comes, net_rx_action 85 calls, according to net_device registered in poll_list 86 (see reference sign k in FIG. 10), a polling routine configured to dequeue a packet from ring buffer 72, to dequeue the packet (see reference sign l in FIG. 10). At this time, net_rx_action 85 continues the dequeuing until poll_list 86 becomes empty.

Thereafter, net_rx_action 85 notifies netif_receive_skb 87 (see reference sign m in FIG. 10).

netif_receive_skb 87 creates a sk_buff structure, analyzes the content of the packet, and assigns processing to the subsequent protocol processor 74 (see FIG. 9) in a manner depending on the type. That is, netif_receive_skb 87 analyzes the content of the packet and, when processing is to be performed according to the content of the packet, assigns the processing to ip_rcv 88 of <Protocol Layer>, and, for example, in the case of L2, assigns processing to arp_rcv 89

CITATION LIST

Patent Literature

PTL 1: JP 2015-197874 A
PTL 2: JP 2018-32156 A

Non Patent Literature

NPL 1: Soft Patch Panel, [online], [retrieved on Dec. 1, 2019), Internet (URL: http://dpdk.org/browse/apps/spp/)
NPL 2: New API (NAPI), [online], [retrieved on Dec. 1, 2019] Internet (URL: http://http://lwn.net/2002/0321/a/napi-howto.php3)

SUMMARY OF THE INVENTION

Technical Problem

However, the packet transfer based on the interrupt model and the packet transfer based on the polling model have the following problems.

In the interrupt model, the kernel that receives an event (hardware interrupt) from the HW performs packet transfer through software interrupt processing for performing packet processing. As the interrupt model transfers packets through an interrupt (software interrupt) processing, there is a problem in that when a competition with other interrupts occurs and/or when the interrupt destination CPU is in use by a process with a higher priority, a wait occurs, and thus the delay in packet transfer increases. In this case, if the interrupt processing is congested, the wait delay further increases.

For example, as illustrated in FIG. 7, in packet transfer based on the interrupt model, a packet is transferred through interrupt processing (see reference signs a and b in FIG. 7), and therefore a wait due to the interrupt processing occurs and the delay in packet transfer increases.

A supplemental description will be given of the mechanism by which a delay occurs in the interrupt model.

In a general kernel, in packet transfer processing, packet transfer processing is performed in software interrupt processing after hardware interrupt processing.

When a software interrupt for packet transfer processing occurs, the software interrupt processing cannot be executed immediately under the conditions (1) to (3) described below. Thus, a wait in the order of milliseconds occurs due to the software interrupt processing being mediated and scheduled by a scheduler such as ksoftirqd (a kernel thread for each CPU; executed when the load of the software interrupt becomes high).

(1) When there is a competition with other hardware interrupt processing
(2) When there is a competition with other software interrupt processing
(3) When the interrupt destination CPU is in use by another process or a kernel thread (migration thread, etc.), which has a higher priority.

Under the above conditions, the software interrupt processing cannot be executed immediately.

In addition, a NW delay in the order of milliseconds also occurs in the same manner in the packet processing by New API (NAPI) due to a competition with an interrupt processing (softIRQ), as indicated in the dashed box p in FIG. 10.

On the other hand, the polling model performs polling on a communication queue while occupying the CPU, and dequeues packets immediately at the time of their arrivals. Although the polling model can reduce the transfer delay, it is necessary to equip the APL with a polling function, and therefore the APL needs to be modified.

For example, as illustrated in FIG. 8, in packet transfer based on the polling model, it is necessary to equip packet processing APL 1 with dpdk (PMD) 2, which is a functional part for performing polling, in the Guest OS 50 section. Thus, it is necessary to modify the packet processing APL 1.

The present invention has been made in view of such a background, and an object of the present invention is to perform packet transfer with a reduced delay in a server without modifying an APL.

Means for Solving the Problem

To solve the above-described problem, an aspect of the present invention is a server delay control device deployed in a kernel of an OS of a server implemented using a computer comprising one or more hardware processors. The OS includes: the kernel; a ring buffer managed by the kernel, in a memory space in which the server deploys the OS; and a poll list in which packet arrival information is to be registered, the packet arrival information being indicative of an arrival of a packet to the ring buffer, The server delay control device is configured to spawn a thread configured to monitor a packet arrival according to a polling model. The server delay control device includes: a packet arrival monitoring part configured to monitor from the thread whether the packet arrival information has been registered in the poll list; and a packet dequeuer configured to, when the packet arrival information has been registered in the poll_list, dequeue the packet from the ring buffer on the basis of the packet arrival information.

Effects of the Invention

According to the present invention, packet transfer can be performed with a reduced delay in the server without modifying the APL.

DESCRIPTION OF EMBODIMENTS

Hereinafter, a server delay control system and the like in a mode for carrying out the present invention (hereinafter, referred to as "the present embodiment") will be described with reference to the drawings.

Overview

Figure 1:
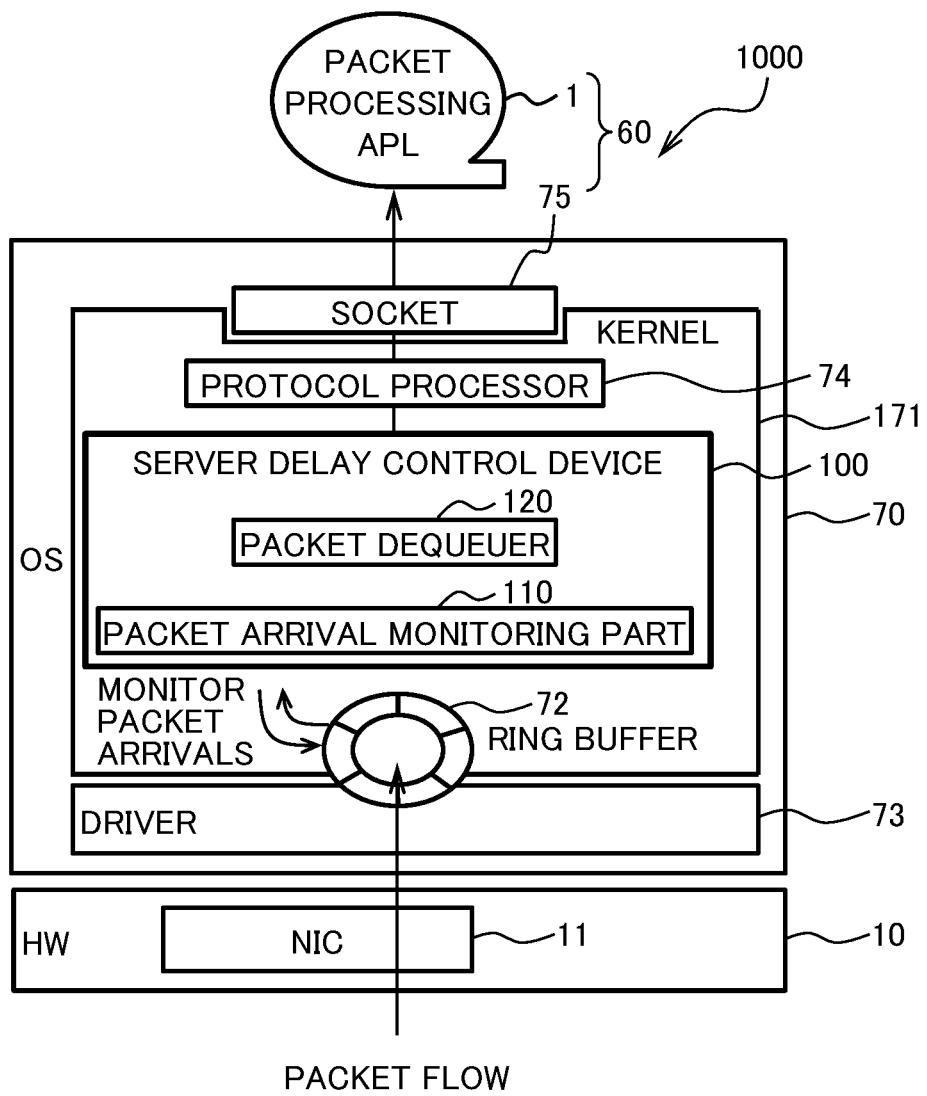
FIG. 1 is a schematic configuration diagram of a server delay control system according to an embodiment of the present invention.

FIG. 1 is a schematic configuration diagram of a server delay control system according to an embodiment of the present invention. The present embodiment is an example applied to Rx-side packet processing by New API (NAPI) implemented in Linux kernel 2.5/2.6 and later versions. The same components as those in FIG. 9 are denoted by the same reference signs thereas.

As illustrated in FIG. 1, a server delay control system 1000 is a system that executes, on a server including an OS 70 (e.g., a Host OS), a packet processing APL 1 deployed in a user space 60, which can be used by a user, and performs packet transfer between packet processing APL 1 and an NIC 11 of HW 10 connected to OS 70.

OS 70 has a kernel 171, a ring buffer 72, and a driver 73. Kernel 171 has a server delay control device 100 and a protocol processor 74.

Figure 9:
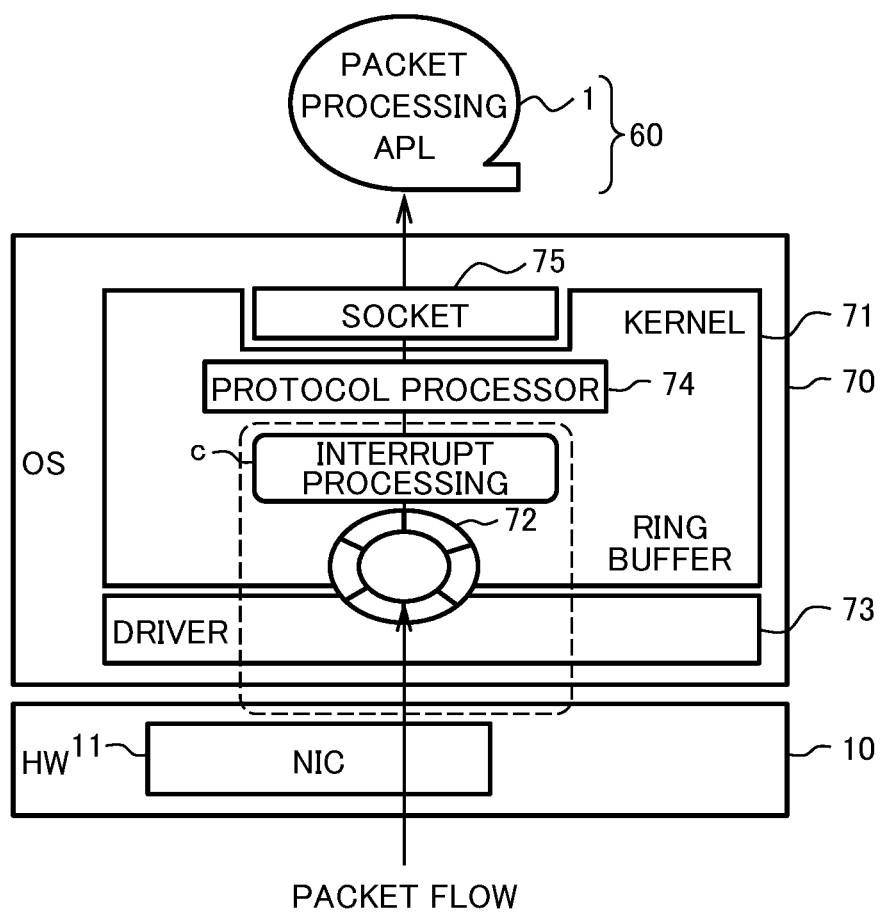
FIG. 9 is a schematic diagram of Rx-side packet processing by New API (NAPI) implemented in Linux kernel 2.5/2.6 and later versions.

In the present embodiment, kernel 171 is given a new reference numeral to be distinguished from kernel 71 illustrated in FIG. 9, because the former includes server delay control device 100. Kernel 171 has the same function as kernel 71 illustrated in FIG. 9 (see FIG. 9), except that server delay control device 100 is installed in kernel 171. Note that kernel 171 may be embodied without reconstructing (newly building) existing kernel 71 (see FIG. 9), by using Livepatch (described below).

Kernel 171 has the function of the core portion of OS 70 (e.g., a Host OS) and monitors hardware and manages program execution states, on a per-process basis. Here, kernel 171 responds to requests from packet processing APL 1 and communicates requests from HW 10 to packet processing APL 1. Kernel 171 processes requests from packet processing APL 1 via system calls.

Kernel 171 transmits packets to packet processing APL 1 via a socket 75. Kernel 71 receives packets from packet processing APL 1 via socket 75.

Kernel 171 manages the ring buffer 72, in a memory space in the server. Ring buffer 72 is a constant-sized buffer that stores messages output by kernel 171 as logs, and is overwritten from the beginning when the messages exceed a maximum size.

Driver 73 is a device driver for monitoring hardware in kernel 171.

Protocol processor 74 performs protocol processing of L2/L3/L4 defined by the OSI reference model.

Socket 75 is an interface for kernel 171 to perform inter-process communication. Socket 75 has a socket buffer and does not frequently cause a data copying process.

Server Delay Control Device

Server delay control device 100 includes a packet arrival monitoring part 110 and a packet dequeuer 120.

Packet arrival monitoring part 110 is a thread for monitoring whether a packet has arrived. Packet arrival monitoring part 110 monitors (busy-polls) a poll_list 186 (see FIG. 2) all the time.

Packet arrival monitoring part 110 retrieves, from poll_list 186, pointer information indicative of the presence of a packet present in ring buffer 72 (see FIG. 2) and net_device information, and communicates the information (pointer information and net_device information) to the packet dequeuer 120. Here, if there are multiple pieces of packet information in poll_list 186, packet arrival monitoring part 110 communicates with packet dequeuer 120 for the multiple pieces of information.

When a packet has arrived, packet dequeuer 120 references the packet held in ring buffer 72, and performs, on the basis of the processing to be performed next, dequeuing to remove the corresponding queue entry from ring buffer 72 (hereinafter, description regarding the dequeuing is sometimes abbreviated as "dequeuing the packet from ring buffer 72" and the like). Packet dequeuer 120 retrieves the packet from ring buffer 72 on the basis of the communicated information and transmits the packet to netif_receive_skb 87.

Figure 2:
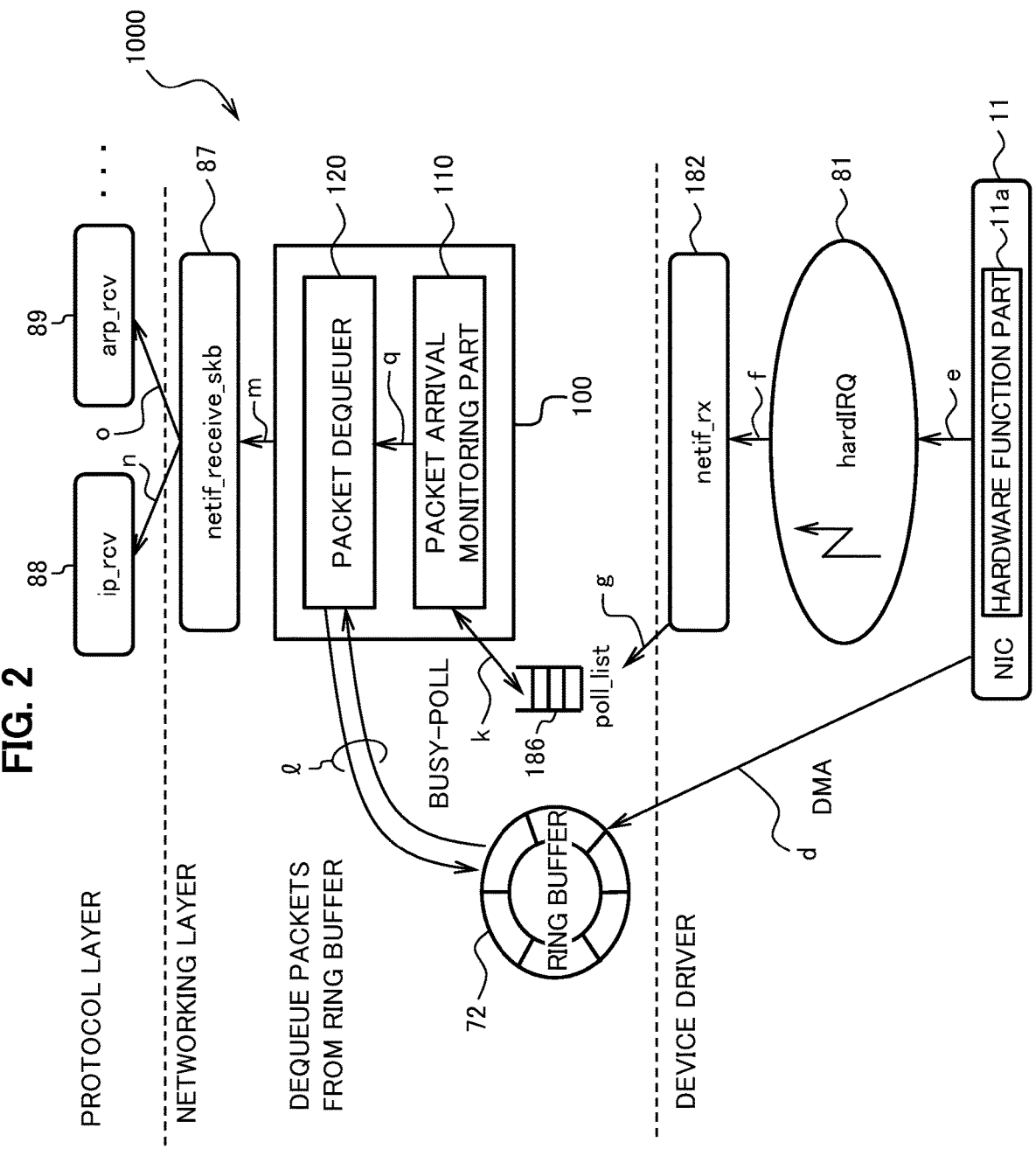
FIG. 2 is an explanatory diagram illustrating details of Rx-side packet processing by New API (NAPI) of the server delay control system according to the embodiment of the present invention.
Figure 10:
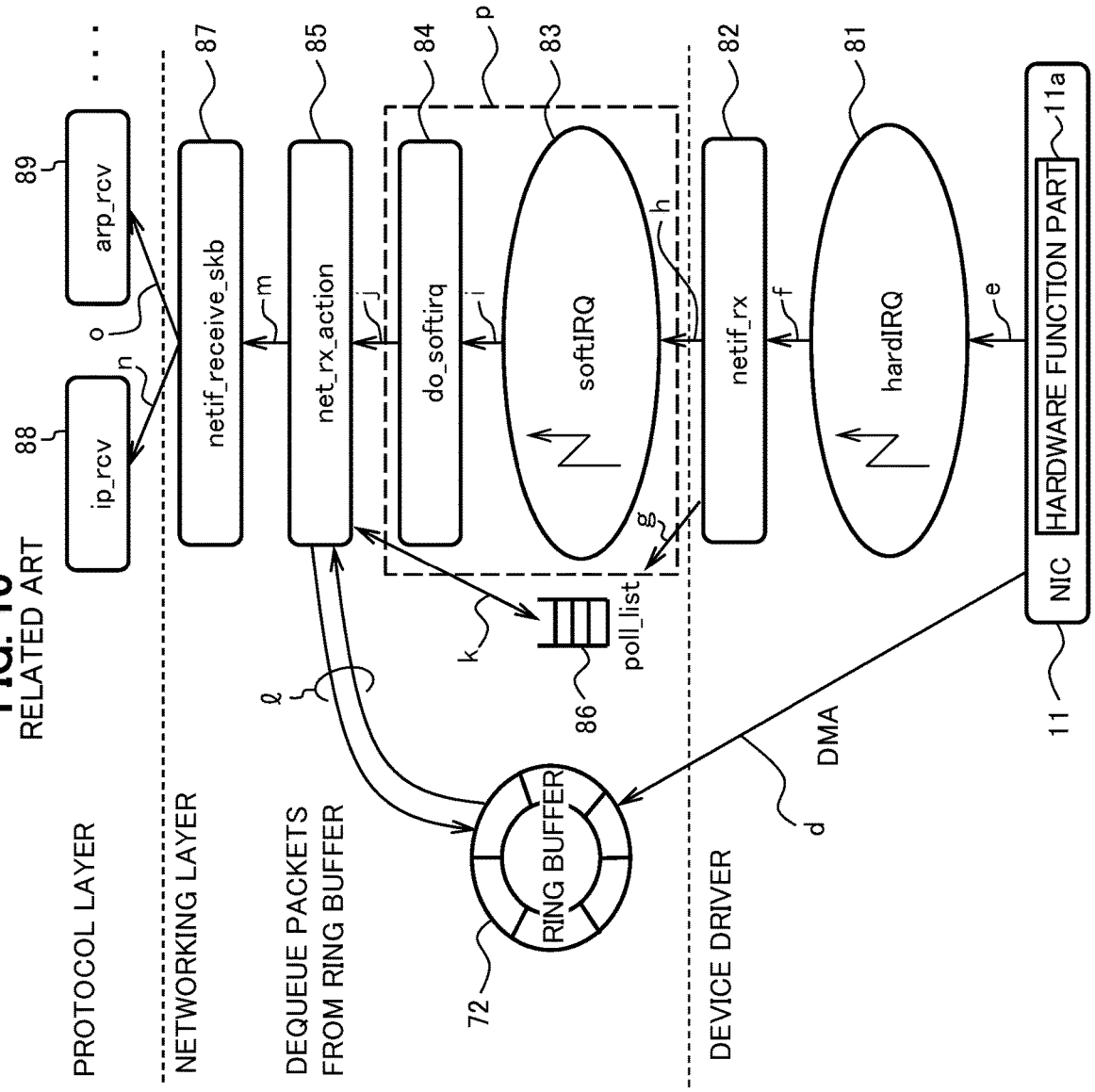
FIG. 10 is an explanatory diagram for explaining an overview of Rx-side packet processing by New API (NAPI) at the part surrounded by the dashed line in FIG. 9.

FIG. 2 is an explanatory diagram illustrating details of Rx-side packet processing by New API (NAPI) of server delay control system 1000 in FIG. 1. The same components as those in FIGS. 1 and 10 are denoted by the same reference signs thereas.

Device Driver

As illustrated in FIG. 2, components deployed in the device driver include; NIC 11, which is a network interface card; hardIRQ 81, which is a handler called due to the generation of a processing request from NIC 11 to perform the requested processing (hardware interrupt); and netif_rx 182, which is a functional part for processing the hardware interrupt.

Networking Layer

The components deployed in the networking layer include: poll_list 186, in which information on a net_device (net_device), indicative of which device the hardware interrupt from NIC 11 comes from, is registered; packet arrival monitoring part 110; netif_receive_skb 87, which creates a sk_buff structure for socket communication in which no interrupt occurs, wherein sk_buff is a structure for kernel 171 to indicate the state of a packet; and ring buffer 72.

Protocol Layer

The components deployed in the protocol layer include: ip_rcv 88, arp_rcv 89, and the like, which are packet processing function parts. Note that, protocol processing other than ip_rcv 88 and arp_rcv 89 is present.

The above-described netif_rx 182, do_softirq 84, net_rx_action 85, netif_receive_skb 87, ip_rcv 88, and arp_rcv 89 are program components (function names) used for packet processing in kernel 171.

Hereinbelow, a description will be given of an operation of server delay control system 1000.

Rx-Side Packet Processing Operation by New API (NAPI)

The arrows (reference signs) d to g and k to o in FIG. 2 indicate the flow of the Rx-side packet processing.

Upon reception of a packet in a frame (or upon reception of a frame) from a remote device, NIC 11 copies the arrived packet to ring buffer 72 (see reference sign d in FIG. 2) by a DMA transfer without using the CPU. This ring buffer 72 is managed in a memory space in the server by kernel 171 (see FIG. 1).

When the packet has arrived, NIC 11 raises a hardware interrupt (hardIRQ) to hardIRQ 81 (handler) (see reference sign e in FIG. 2) and netif_rx 182 performs the processing described below, which causes kernel 171 to notice the packet.

When hardIRQ 81 (handler) has started execution (see reference sign f in FIG. 2), netif_rx 182 stores, into poll_list 186, information of a net_device (net_device), which is one piece of information of the content of the hardware interrupt (hardIRQ) and which indicates which device the hardware interrupt from NIC 11 comes from, and registers (see reference sign g in FIG. 2) dequeuing operation information in poll_list 186. Specifically, in response to the packet having been loaded into ring buffer 72, netif_rx 182 registers (see reference sign g in FIG. 2), in poll_list 186, a dequeuing operation to be performed subsequently, using a driver of NIC 11. As a result, information on the dequeuing operation due to the packet having been loaded into ring buffer 72 is registered into poll_list 186.

Although netif_rx 182 registers net_device in poll_list 186, it does not perform scheduling of a software interrupt (softIRQ), unlike netif_rx 82 illustrated in FIG. 10. That is, netif_rx 182 differs from netif_rx 82 in FIG. 10 in that netif_rx 182 does not perform scheduling of a software interrupt (softIRQ).

With the above-described processing, the hardware interrupt processing by Device Driver, illustrated in FIG. 2, ends.

In the present embodiment, in the networking layer illustrated in FIG. 10, softIRQ 83 and do_softirq 84 are eliminated, and accordingly, netif_rx 82, illustrated in FIG. 10, does not perform communication to raise softIRQ 83 (handler) (see reference sign h in FIG. 10).

In the present embodiment, softIRQ 83 and do_softirq 84, illustrated in FIG. 10, are eliminated in server delay control system 1000, and instead, server delay control device 100 is deployed, in the server, in the memory space of the networking layer, illustrated in FIG. 2.

In the networking layer illustrated in FIG. 2, packet arrival monitoring part 110 of server delay control device 100 monitors (busy-polls) poll_list 186 all the time (see reference sign k in FIG. 2) to check if a packet has arrived.

Packet arrival monitoring part 110 retrieves pointer information indicative of the presence of a packet in ring buffer 72 and net_device information from poll_list 186 and communicates the information (pointer information and net_device information) to packet dequeuer 120 (see reference sign q in FIG. 2). Here, if multiple pieces of packet information are present in the poll_list 186, information as many as the multiple pieces is communicated.

When a packet has arrived, packet dequeuer 120 of server delay control device 100 dequeues the packet from ring buffer 72 (see reference sign 1 in FIG. 2).

Packet dequeuer 120 retrieves the packet from ring buffer 72 according to the communicated information and communicate the packet to netif_receive_skb 87 (see reference sign m in FIG. 2).

In this way, server delay control system 1000 halts softIRQ of the packet processing which is the main cause of the occurrence of the NW delay, and executes the thread, in which packet arrival monitoring part 110 of server delay control device 100 monitors packet arrivals all the time. Packet dequeuer 120 performs packet processing according to the polling model (no softIRQ) at the time of packet arrival.

Netif_receive_skb 87 creates a sk_buff structure, analyzes the content of the packet, and assigns processing to the protocol processor 74 arranged in the subsequent stage (see FIG. 9) in a manner depending on the type. That is, netif_receive_skb 87 analyzes the content of the packet and, in the case when processing is to be performed according to the content of the packet, assigns the processing to ip_rcv 88 of the protocol layer, and, for example, in the case of L2, assigns processing to arp_rcv 89.

Registration Operation Using Livepatch

Next, a description will be given of a registration operation using Livepatch.

In server delay control system 1000 (see FIG. 1), kernel 171 of OS 70, illustrated in FIG. 1, includes server delay control device 100. Kernel 171 can be embodied without reconstructing (newly building) existing kernel 71 (see FIG. 9), by using Livepatch. Hereinbelow, a description will be given of Livepatch applied to kernel 171.

Livepatch is a kernel patch function to be applied to Linux (trade name) kernel. Using Livepatch, it is possible to instantly apply modification to the kernel space without rebooting the system. Specifically, (1) Livepatch suppresses the softIRQ scheduling function of netif_rx 182 (see FIG. 2).
(2) Livepatch starts a thread that monitors packet arrivals (packet arrival monitoring part 110, specifically, isol_net_rx). When the thread (packet arrival monitoring part 110) is started, the thread occupies the CPU core so that the busy polling (see reference sign k in FIG. 2) is not interfered by other processes or kernel threads. To do so, the thread is assigned a high priority setting, such as one for a real-time process. According to the number of traffic flows (or traffic amount), the thread is started on multiple CPU cores and assigned a poll_list 186 to be monitored (see FIG. 2). This allows scaling-out according to the traffic flow (traffic amount).

Thereafter, the operation of the packet processing illustrated in FIG. 2 is performed.

Rx-Side Packet Processing Operation Flow of Server Delay Control Device 100

Figure 3:
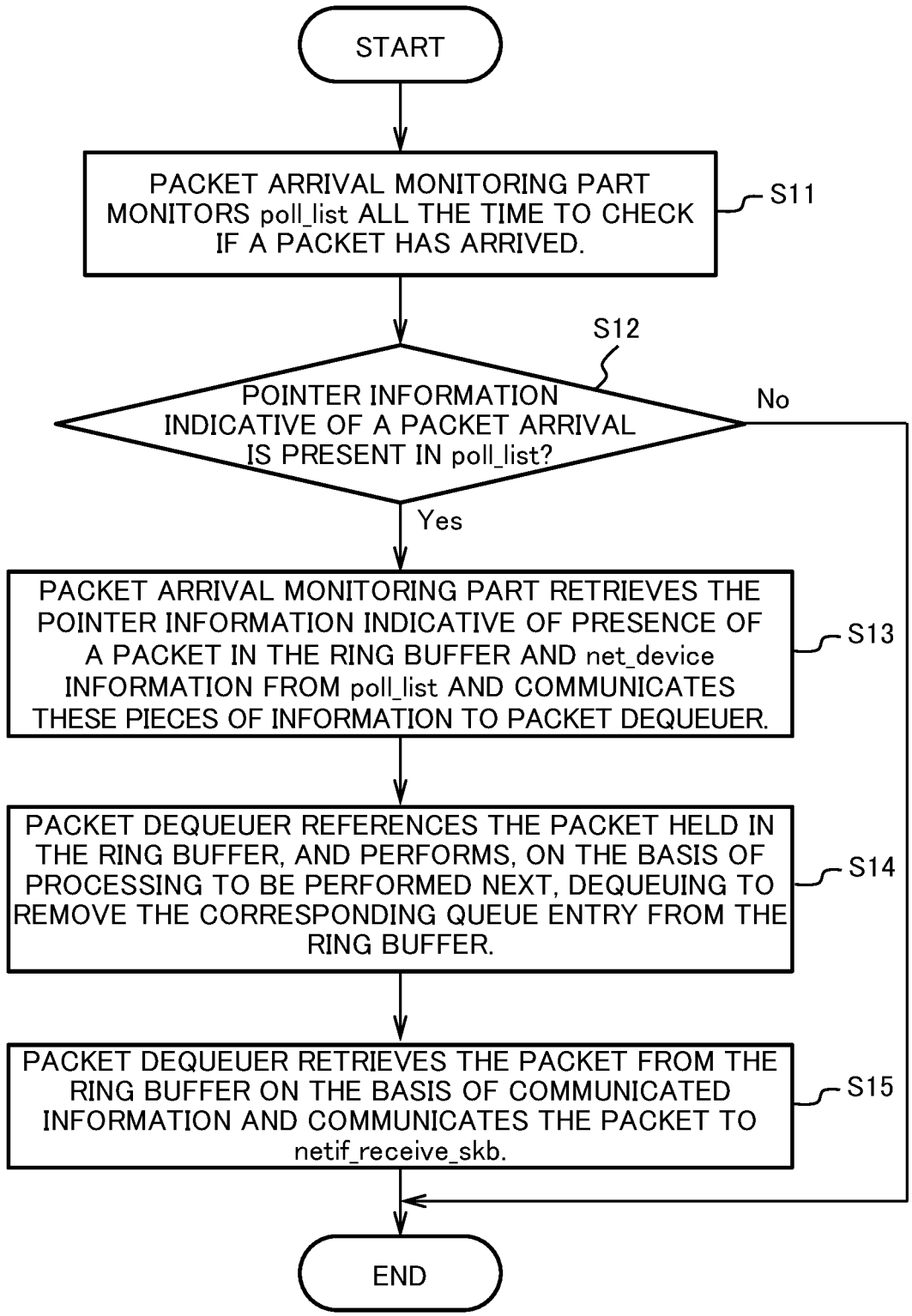
FIG. 3 is a flowchart illustrating Rx-side operations of a server delay control device of the server delay control system according to the embodiment of the present invention.

FIG. 3 is a flowchart illustrating Rx-side operations of server delay control device 100 (see FIG. 2). Hereinafter, the operations of the Rx side will be described with reference to FIG. 2.

In step S11, packet arrival monitoring part 110 (see FIG. 2) of server delay control device 100 monitors (busy-polls) poll_list 186 (see reference sign k in FIG. 2) all the time while occupying the CPU, to check if a packet has arrived.

In step S12, packet arrival monitoring part 110 (see FIG. 2) determines whether pointer information indicative of a packet arrival is present in poll_list 186.

If pointer information indicative of a packet arrival is present in poll_list 186 (Yes in S12), the flow proceeds to step S13, and if information indicative of a packet arrival is not present in poll_list 186 (No in S12), the flow is terminated.

In step S13, packet arrival monitoring part 110 retrieves pointer information indicative of the packet present in ring buffer 72 (see FIG. 2) and net_device information from poll_list 186 and communicates these pieces of information (pointer information and net_device information) to packet dequeuer 120 (see reference sign q in FIG. 2). Here, if multiple pieces of packet information are present in poll_list 186, information as many as the multiple pieces is communicated.

In step S14, when a packet has arrived, packet dequeuer 120 (see FIG. 2) of server delay control device 100 references the packet held in the ring buffer 72, and performs, on the basis of the processing to be performed next, dequeuing to remove the corresponding queue entry from ring buffer 72 (see reference sign 1 in FIG. 2).

In step S15, packet dequeuer 120 retrieves the packet from ring buffer 72 on the basis of the communicated information and communicates (see reference sign m in FIG. 2) the packet to netif_receive_skb 87. Then, the flow is terminated.

Difference Between Present Embodiment and Existing Technique

Next, a description will be given of differences between the present embodiment and the existing technique (see FIG. 10).

BACKGROUND

Generally, it is required that a hardware interrupt (hardIRQ) have a high priority and the processing of the corresponding CPU be interrupted to process the processing of hardIRQ with the highest priority. For this reason, the overhead is large. In view of this, general design concept for hardIRQ and softIRQ is such that hardIRQ only issues a notification of a packet arrival and a softIRQ processes the packet (this design concept is called "principle of kernel"). Here, there can be an event such that the softIRQ competes with other softIRQs and is put in a wait state. This event is a cause for the occurrence of a delay.

The reason that the conventional technique uses the interrupt model is that conventional technique is based on the design concept such that one CPU core is shared with other processing because the CPU resources are limited in the past (or because the processing is to be performed even in a device with fewer CPU cores as a single board computer like Raspberry Pi). In this case, processing is performed while switching CPU times in normal processing, interrupt processing, and the like. Even in the above-described interrupt processing, softIRQs compete with one another and a wait time occurs.

Further, ksoftirqd, which is a scheduler that schedules softIRQs, does not have a function of imparting a priority according to the type of each softIRQ, and the occurrence of a delay caused by the competition cannot be suppressed.

Existing Technique (see FIG. 10)

As illustrated in FIG. 10, kernel 71 (FIG. 9) receives a notification of a packet arrival from NIC 11 via a hardIRQ (see reference sign h in FIG. 10) and schedules a softIRQ for packet processing (see the dashed box p in FIG. 10). At this time, a wait occurs when competing with another interrupt processing, and an NW delay in the order of milliseconds occurs.

Server Delay Control System 1000 (see FIG. 2)

As illustrated in FIG. 2, in the case of server delay control system 1000, although netif_rx 182 registers net_device in poll_list 86 in the networking layer, netif_rx 182 does not perform scheduling of software interrupts (softIRQs) ("modification point 1"), unlike netif_rx 82 in the existing technique (see FIG. 10).

As illustrated in FIG. 2, server delay control system 1000 provides server delay control device 100, in a server memory space, in the networking layer ("modification point 2").

Packet arrival monitoring part 110 of server delay control device 100 monitors (busy-polls) poll_list 186 (see reference sign k in FIG. 2) all the time to check if a packet has arrived.

Packet arrival monitoring part 110 retrieves pointer information indicative of the presence of a packet in ring buffer 72 and net_device information from poll_list 186 and communicates the information (pointer information and net_device information) to packet dequeuer 120 (see reference sign q in FIG. 2).

When a packet has arrived, packet dequeuer 120 of server delay control device 100 dequeues the packet from ring buffer 72 (see reference sign 1 in FIG. 2).

Packet dequeuer 120 retrieves the packet from ring buffer 72 according to the communicated information and communicates the packet to netif_receive_skb 87 (see reference sign m in FIG. 2).

The effects of "modification point 1" described above are as follows.

First, this embodiment follows NAPI regarding the notification of a packet arrival using a hardware interrupt (hardIRQ). Although softIRQs are convenient in that they effectively utilize CPU resources, they are not suitable in terms of immediate packet transfer. In view of this, this embodiment is novel in that the embodiment halts the function of the softIRQs and implement the polling model in the kernel. Specifically, this is reflected in that netif_rx 182, illustrated in FIG. 2, does not issue a notification for raising softIRQ 83 (handler) (see reference sign h in FIG. 10) unlike netif_rx 82, illustrated in FIG. 10.

Figure 8:
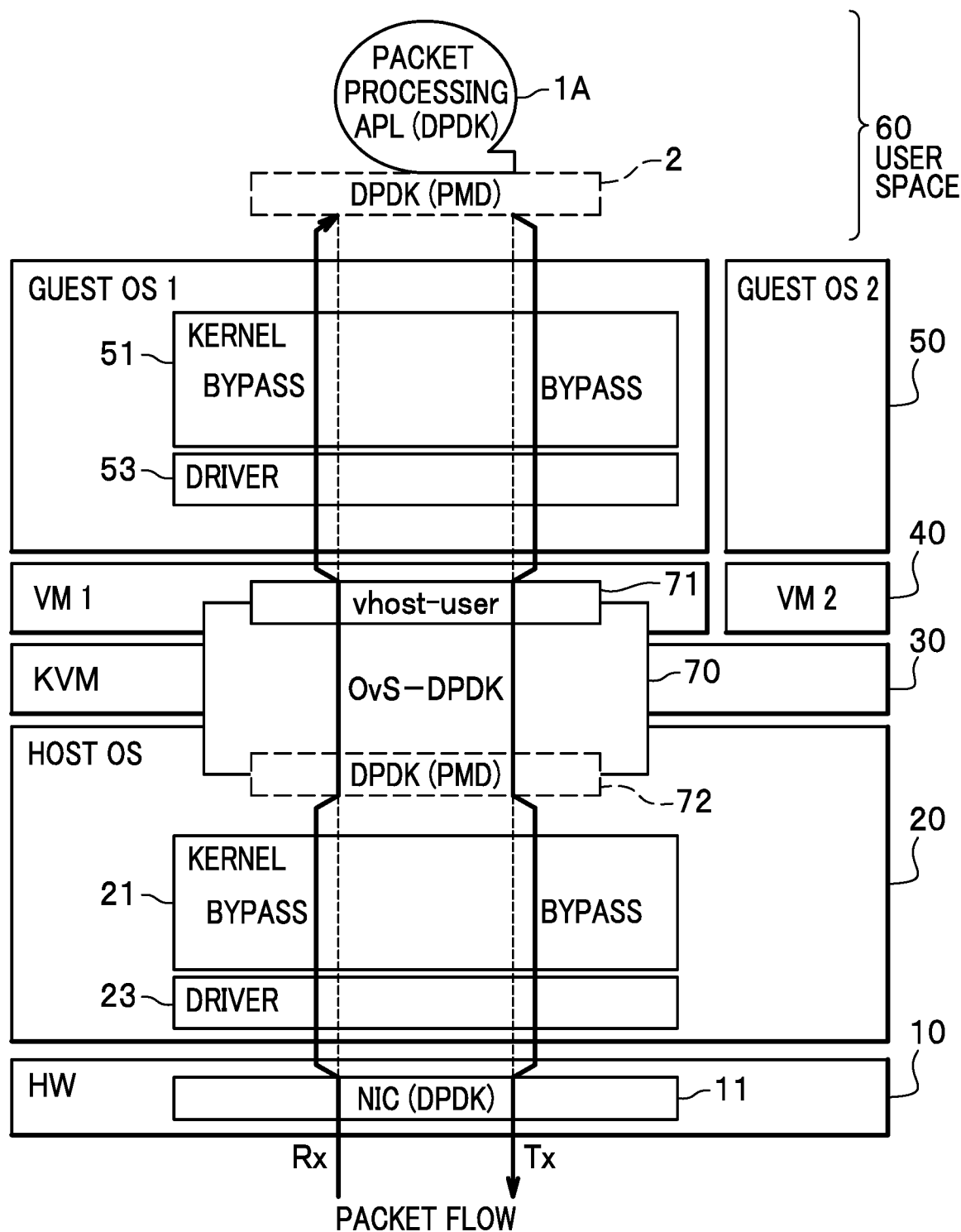
FIG. 8 is an explanatory diagram illustrating packet transfer based on a polling model in an OvS-DPDK configuration.

Note that, with respect to the polling model, DPDK, which performs polling from a user space, is known as an existing technique (see FIG. 8). However, DPDK requires modification of the APL because the polling is to be performed from the APL.

The effects of the "modification point 2" described above are as follows.

In the present embodiment, a thread (packet arrival monitoring part 110 of server delay control device 100) dedicated to polling is started in kernel 171 illustrated in FIG. 2, and packet dequeuer 120 of server delay control device 100 performs packet processing according to the polling model (no softIRQ) at the time of packet arrival. This eliminates the need of modifying the APL, and, in other words, makes it possible to use an existing PO SIX socket API.

In addition, to prevent the above-described thread from being deprived of a CPU time by other softIRQs or the like, the CPU is occupied at the time of starting the thread and the thread is given a high priority as described above in "Registration using Livepatch", thereby the polling will not be interfered.

Hardware Configuration

Figure 4:
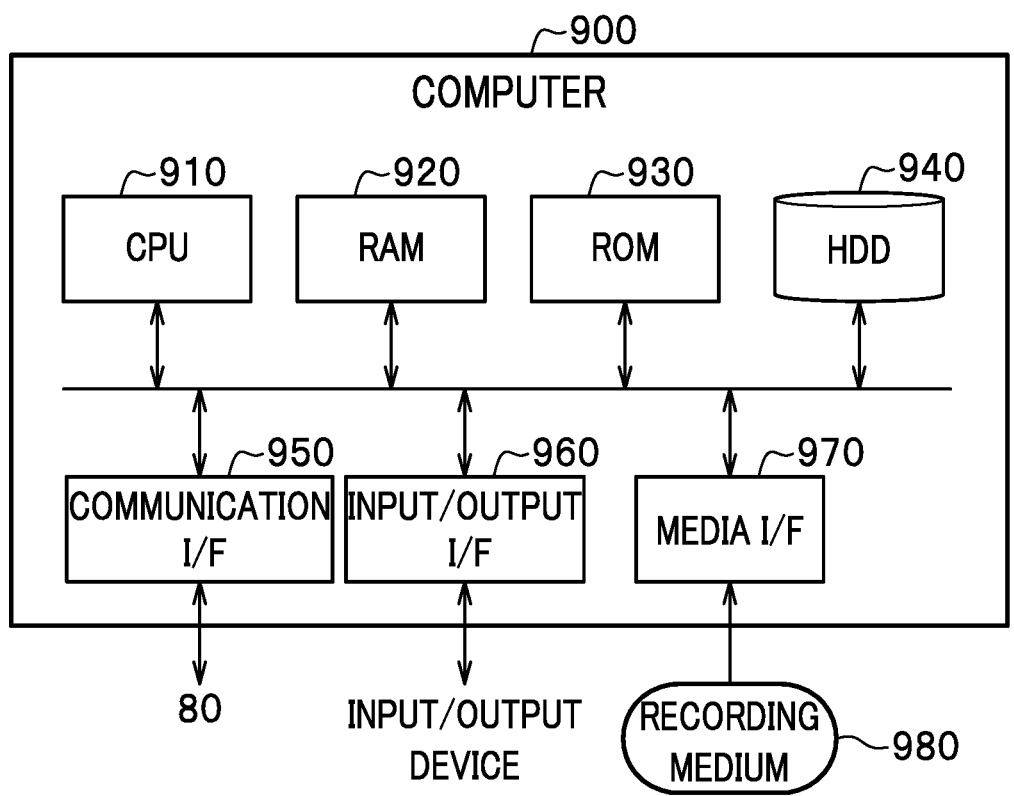
FIG. 4 is a hardware configuration diagram illustrating an example of a computer for realizing the functions of the server delay control device of the server delay control system according to the embodiment of the present invention.

The server delay control device 100 according to the present embodiment is embodied by, for example, a computer 900 having a configuration as illustrated in FIG. 4.

FIG. 4 is a hardware configuration diagram illustrating an example of computer 900 that embodies the functions of server delay control device 100.

Computer 900 includes a CPU 910, a RAM 920, a ROM 930, an HDD 940, a communication interface (I/F: Interface) 950, an input/output interface (I/F) 960, and a media interface (I/F) 970.

CPU 910 operates and performs control of each portion according to a program stored in ROM 930 or HDD 940. ROM 930 stores a boot program to be executed by CPU 910 when computer 900 starts up, a program that relies on the hardware of computer 900, and the like.

HDD 940 stores programs to be executed by CPU 910, data to be used by the programs, and the like. Communication interface 950 receives data from another device via a communication network 80, sends the received data to CPU 910, and transmits data generated by CPU 910 to another device via communication network 80.

CPU 910 controls an output device such as a display or a printer and an input device such as a keyboard or a mouse via input/output interface 960. CPU 910 receives data from the input device via input/output interface 960. Also, CPU 910 outputs generated data to the output device via input/output interface 960.

Media interface 970 reads a program or data stored in a recording medium 980 and provides the read program or data to CPU 910 via RAM 920. CPU 910 loads the program from recording medium 980 onto RAM 920 via media interface 970 and executes the loaded program. Recording medium 980 is, for example, an optical recording medium such as a DVD (Digital Versatile Disc) or PD (Phase change rewritable Disk), a magneto-optical recording medium such as an MO (Magneto Optical disk), a tape medium, a magnetic recording medium, a semiconductor memory, or the like.

For example, if computer 900 functions as a server delay control device 100 according to the present embodiment, CPU 910 of computer 900 embodies the function of each portion of server delay control device 100 by executing the program loaded on RAM 920. Also, HDD 940 stores the data in each portion of server delay control device 100. CPU 910 of computer 900 reads these programs from recording medium 980 and executes them, but in another example, these programs may be received from another device via communication network 80.

Application Example

Server delay control device 100 is to be a server delay control device that spawns in the kernel a thread that monitors packet arrivals according to the polling model. There is no limitation to the OS. Also, there is no limitation to being in a server virtualization environment. Accordingly, server delay control system 1000 can be applied to each of the configurations illustrated in FIGS. 5 and 6.

Example of Application to VM Configuration

Figure 5:
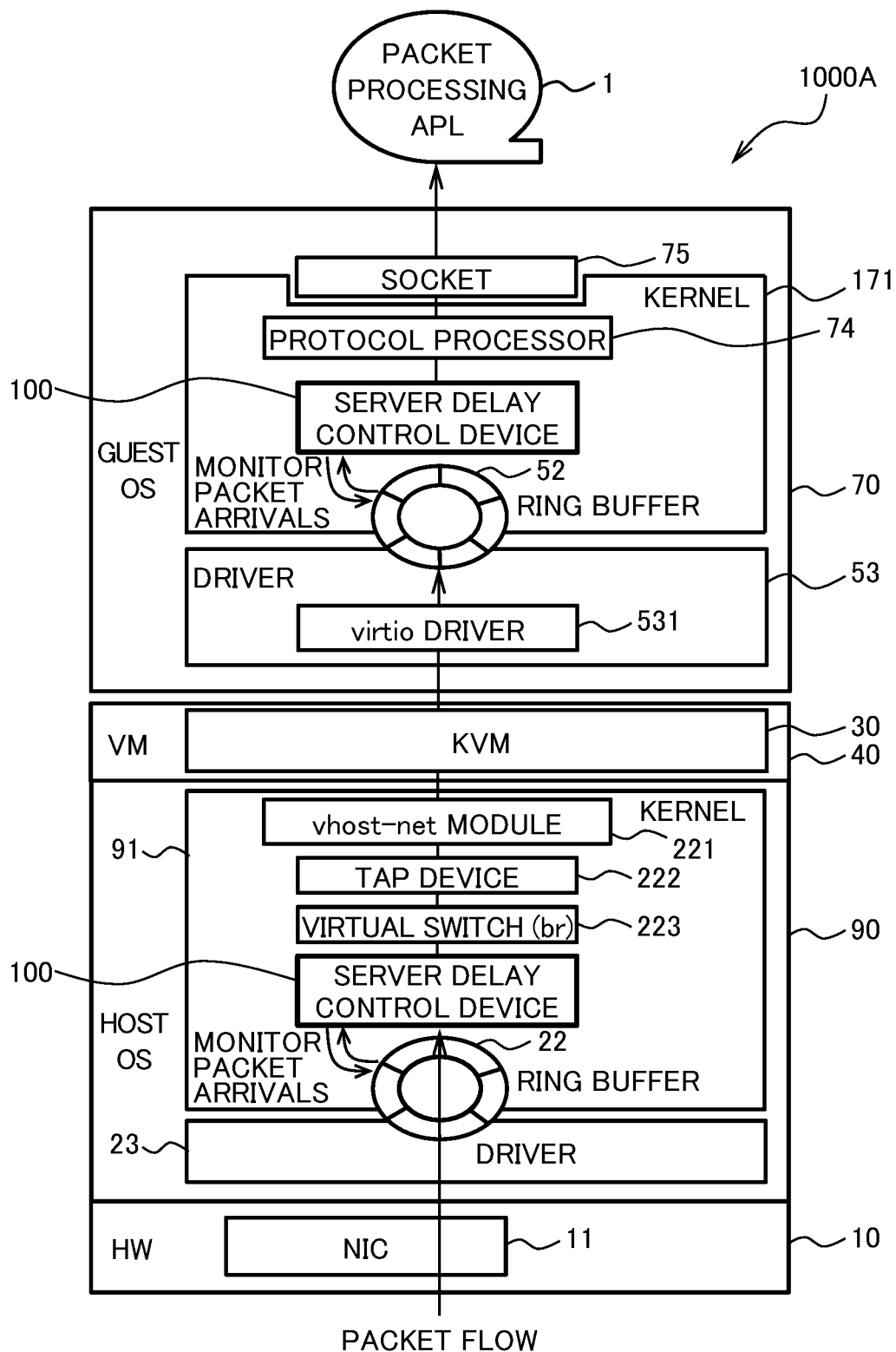
FIG. 5 is a diagram illustrating an example in which the server delay control system is applied to an interrupt model in a server virtualization environment which is configured with a general-purpose Linux kernel and a VM.
Figure 7:
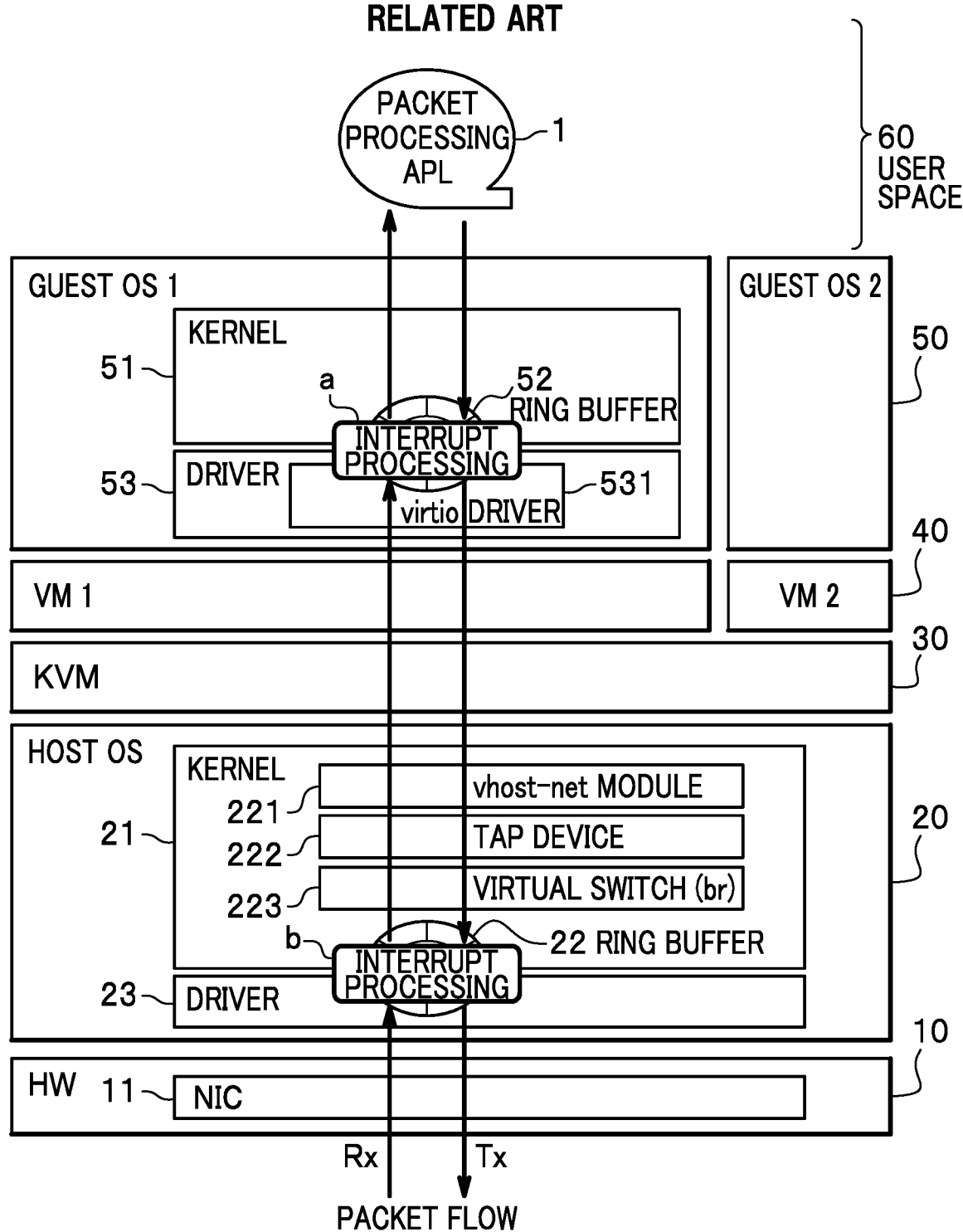
FIG. 7 is an explanatory diagram illustrating packet transfer operations performed according to an interrupt model in a server virtualization environment which is configured with a general-purpose Linux kernel and a VM.

FIG. 5 is a diagram illustrating an example in which a server delay control system 1000A is applied to the interrupt model in a server virtualization environment which is configured with a general-purpose Linux kernel and a VM. The same components as those in FIGS. 1 and 7 are denoted by the same reference signs thereas.

As illustrated in FIG. 5, server delay control system 1000A is such that a server delay control device 100 is deployed in a kernel 171 of a Guest OS 70 and another server delay control device 100 is deployed in a kernel 91 of a Host OS 90.

In detail, the server includes: Host OS 90, on which a virtual machine and an external process formed outside the virtual machine can operate; and Guest OS 70, which operates in the virtual machine.

Host OS 90 includes: a kernel 91; a ring buffer 22 that is managed by kernel 91, in a memory space in which the server deploys host OS 90, and a poll_list 186 (see FIG. 2), in which information on net device, indicative of which device the hardware interrupt (hardIRQ) from a NIC 11 comes from, is registered; a vhost-net module 221, which is a kernel thread; a TAP device 222, which is a virtual interface created by kernel 91; and a virtual switch (br) 223.

Kernel 91 includes: a packet arrival monitoring part 110 configured to monitor (busy-polls) poll_list 186 all the time; and a packet dequeuer 120 configured to, when a packet has arrived, reference the packet held in a ring buffer 72, and perform, on the basis of the processing to be performed next, dequeuing to remove the corresponding queue entry from ring buffer 72.

Kernel 91 transmits the packet to a virtual machine 30 via TAP device 222.

On the other hand, Guest OS 70 includes: a kernel 171; a ring buffer 52 that is managed by kernel 171, in a memory space in which the server deploys Guest OS 70; a poll_list 186 (see FIG. 2), in which information on net device, indicative of which device the hardware interrupt (hardIRQ) from NIC 11 comes from, is registered; a socket 75, which is an interface for kernel 171 to perform inter-process communication.

Kernel 171 includes: a packet arrival monitoring part 110 configured to monitor (busy-polls) a poll_list 186 all the time; and a packet dequeuer 120 configured to, when a packet has arrived, reference the packet held in a ring buffer 52, and perform, on the basis of the processing to be performed next, dequeuing to remove the corresponding queue entry from ring buffer 52; and a protocol processor 74 configured to perform protocol processing on the packet on which the dequeuing is performed.

Kernel 171 communicates the packet to a packet processing APL 1 via protocol processor 74.

In this way, in a system with a VM virtual server configuration, packet transfer can be performed with reduced delays in the server without modifying the APL in any OS of Host OS 90 and Guest OS 70.

Example of Application to Container Configuration

Figure 6:
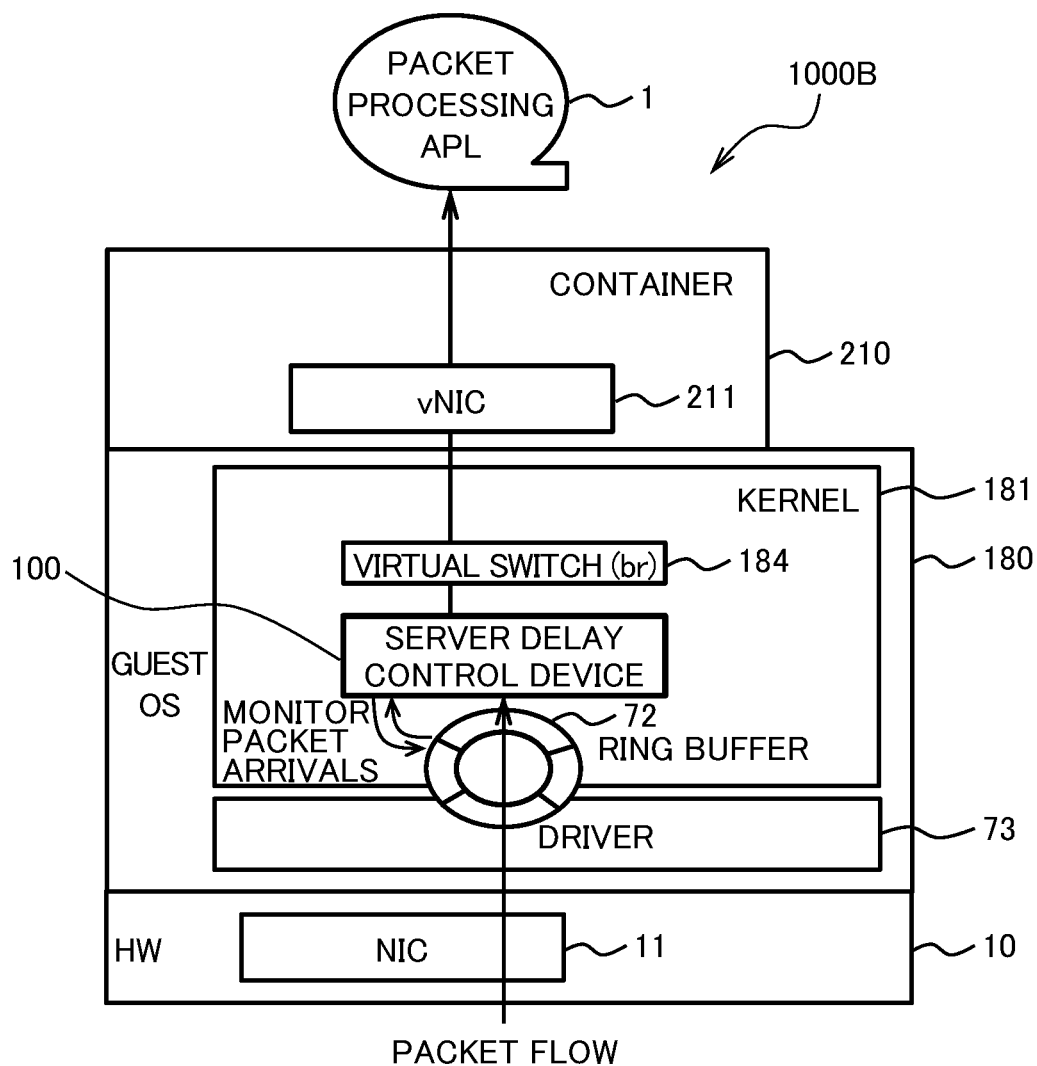
FIG. 6 is a diagram illustrating an example in which the server delay control system is applied to an interrupt model in a server virtualization environment having a container configuration.

FIG. 6 is a diagram illustrating an example in which a server delay control system 1000B is applied to an interrupt model in a server virtualization environment with a container configuration. The same components as those in FIG. 1 are denoted by the same reference signs thereas.

As illustrated in FIG. 6, server delay control system 1000B has a container configuration in which a Guest OS 180 and, in place of an OS, a Container 210 are deployed. Container 210 includes a vNIC (virtual NIC) 211. A server delay control device 100 is deployed in a kernel 181 of Guest OS 180.

In the system with the virtual server configuration, such as a container, packet transfer can be performed with a reduced delay in the server without modifying the APL.

Example of Application to Bare-Metal Configuration (Non-Virtualized Configuration)

The present invention can be applied to a system with a non-virtualized configuration, such as in a bare-metal configuration. In a non-virtualized configuration system, packet transfer can be performed with a reduced delay in a server without modifying an APL 3.

Extended Technique

The present invention makes it possible to scale out against a network load by increasing the number of CPUs allocated to a packet arrival monitoring thread in conjunction with receive-side scaling (RSS), which is capable of processing inbound network traffic with multiple CPUs when the number of traffic flows increases.

Effects

As described above, an OS (OS 70) includes: a kernel (kernel 171); a ring buffer (ring buffer 72) managed by the kernel, in a memory space in which a server deploys the OS; and a poll list (poll_list 186), in which information on net device, indicative of which device a hardware interrupt (hardIRQ) from an interface part (NIC 11) comes from, is registered. The kernel includes a server delay control device (server delay control device 100) configured to spawn a thread configured to monitor packet arrivals according to a polling model. The server delay control device includes: a packet arrival monitoring part (packet arrival monitoring part 110) configured to monitor (busy-polls) the poll list; and a packet dequeuer (packet dequeuer 120) configured to, when a packet has arrived, reference the packet held in the ring buffer, and perform, on the basis of the processing to be performed next, dequeuing to remove the corresponding queue entry from the ring buffer.

In this way, server delay control device 100 halts the software interrupts (softIRQs) that perform packet processing, which is the main cause of the occurrence of the NW delay, and executes a thread in which packet arrival monitoring part 110 of server delay control device 100 monitors packet arrivals all the time; and packet dequeuer 120 performs packet processing according to the polling model (no softIRQ) at the time of packet arrival. As a result, the following effects of (1) to (3) are provided.

(1) Software interrupts (softIRQs) at the time of packet arrival, which are the cause of the occurrence of a delay, are halted and the polling model is embodied in the kernel (kernel 171). That is, server delay control system 1000 embodies the polling model rather than the interrupt model, which is the main cause of the NW delay, unlike NAPI of the existing technique. As the packet is immediately dequeued without a wait at the time of packet arrival, packet processing with a small delay can be performed.

(2) There is no need of having an APL equipped with a function for high-speed packet transfer, and the APL is simply to interwork with the existing POSIX socket API of the kernel (kernel 171). That is, server delay control system 1000 does not require the APL to be modified because the polling model is embodied in the kernel, unlike DPDK of the existing technique. Specifically, there is no need of implementing the function for high-speed packet transfer (see dpdk (PMD) 2 in FIG. 8) in packet processing APL 1A (see FIG. 8) as illustrated in FIG. 8. Packet processing APL 1 (see FIG. 1) of server delay control system 1000 is simply to interwork with the existing POSIX socket API in the kernel. Therefore, the implementation is possible without modifying the APL.

(3) For similar reasons, the implementation is possible without the need of creating an original kernel.

Moreover, a Guest OS (Guest OS 70) configured to operate in a virtual machine includes: a kernel (kernel 171); a ring buffer (ring buffer 72) managed by the kernel, in a memory space in which the server deploys the guest OS; a poll list (poll_list 186), in which information on a net device, indicative of which device a hardware interrupt (hardIRQ) from an interface part (NIC 11) comes from, is registered; and a protocol processor (protocol processor 74) configured to perform protocol processing on a packet on which dequeuing has been performed. The kernel includes a server delay control device (server delay control device 100) configured to spawn a thread that monitors a packet arrival according to a polling model. The server delay control device includes: a packet arrival monitoring part (packet arrival monitoring part 110) configured to monitor (busy-polls) the poll list; and a packet dequeuer (packet dequeuer 120) configured to, when a packet has arrived, reference the packet held in the ring buffer, and perform, on the basis of the processing to be performed next, dequeuing to remove the corresponding queue entry from the ring buffer.

In this way, in a system with a VM virtual server configuration, packet transfer can be performed with reduced delays in the server including the guest OS (guest OS 70) without modifying the APL.

Moreover, a Host OS (Host OS 90) on which a virtual machine and an external process formed outside the virtual machine can operate includes: a kernel (kernel 91); a ring buffer (ring buffer 22) managed by the kernel, in a memory space in which the server deploys the Host OS; a poll list (poll_list 186) in which information on net device, indicative of which device a hardware interrupt (hardIRQ) from an interface part (NIC 11) comes from, is registered; and a TAP device (TAP device 222), which is a virtual interface created by the kernel (kernel 91). The kernel includes a server delay control device (server delay control device 100) configured to spawn a thread that monitors packet arrivals according to a polling model. The server delay control device includes: a packet arrival monitoring part (packet arrival monitoring part 110) configured to monitor (busy-polls) the poll list; and a packet dequeuer (packet dequeuer 120) configured to, when a packet has arrived, reference the packet held in the ring buffer (ring buffer 72), and perform, on the basis of the processing to be performed next, dequeuing to remove the corresponding queue entry from the ring buffer.

In this way, in a system with a VM virtual server configuration, packet transfer can be performed with reduced delays in the server including the kernel (kernel 91) and the host OS (host OS 90) without modifying the APL.

In server delay control device 100, the kernel (kernel 171) may include a patch (Livepatch) that is capable of changing the processing operations of the kernel (kernel 171) while running the kernel in a state of having been started.

With this configuration, there is no need of modifying the kernel (kernel 171) because the processing operation of the kernel can be changed using Livepatch. Therefore, there is no need of re-developing the kernel, for example, in the event of each security update of the kernel. The kernel needs to be modified only when there is a change in the associated kernel function.

Note that among the processes described in the above embodiments, all or some of the processes described as being automatically performed can also be manually performed, or all or some of the processes described as being manually performed can also be performed automatically using a known method. Also, the processing procedure, the control procedure, specific names, and information including various types of data and parameters, which have been described in the above-presented description and drawings can be changed as appropriate unless otherwise specified.

Also, each constituent element of the illustrated devices is a functional concept, and does not necessarily need to be physically configured as illustrated in the drawings. That is, the specific forms of the distribution and integration of the devices are not limited to those illustrated in the drawings, and all or some of the specific forms can be functionally or physically distributed or integrated in any unit according to various types of loads, usage conditions, and the like.

Also, the above configurations, functions, processing parts, processing means, and the like may be embodied by hardware by designing a part or all of them with, for example, an integrated circuit, or the like. Also, each of the above configurations, functions, and the like may be embodied by software for the processor to interpret and execute a program for realizing each function. Information such as programs, tables, and files that embody each function can be stored in a memory, a recording device such as a hard disk, or an SSD (Solid State Drive), or a recording medium such as an IC (Integrated Circuit) card, an SD (Secure Digital) card, or an optical disk.

REFERENCE SIGNS LIST

1 Packet processing APL (application)
10 HW
11 NIC (physical NIC) (interface part)
70 OS
74 Protocol processor
60 User space
72 Ring buffer
90 Host OS (OS)
91, 171, 181 Kernel
100 Server delay control device
110 Packet arrival monitoring part
120 Packet dequeuer
180 Guest OS (OS)
186 Poll_list (poll list)
210 Container
1000, 1000A, 1000B Server delay control system

The invention claimed is:

1. A server delay control device deployed in a kernel of an operating system (OS) of a server implemented using a computer comprising one or more hardware processors,
wherein the OS comprises:
the kernel;
a ring buffer managed by the kernel, in a memory space in which the server deploys the OS; and
a poll list in which packet arrival information is to be registered, the packet arrival information being indicative of an arrival of a packet to the ring buffer,
wherein the server delay control device is configured to spawn a thread in the kernel, the thread configured to monitor a packet arrival according to a polling model, and wherein the server delay control device comprises:
a packet arrival monitoring part configured to monitor from the thread whether the packet arrival information has been registered in the poll list; and
a packet dequeuer configured to, when the packet arrival information has been registered in the poll list, dequeue the packet from the ring buffer on the basis of the packet arrival information,
wherein the OS is a Host OS on which a virtual machine and an external process formed outside the virtual machine can operate,
wherein the Host OS further comprises a Test Access Point (TAP) device, which is a virtual interface created by the kernel, and
wherein a software interrupt operation is eliminated in the server delay control device.

2. The server delay control device according to claim 1, wherein the kernel comprises a patch that is capable of changing a processing operation of the kernel while running the kernel in a state of having been started.

3. A server delay control method to be executed by a server delay control device deployed in a kernel of an operating system (OS) of a server implemented using a computer comprising one or more hardware processors,
wherein the OS comprises:
the kernel;
a ring buffer managed by the kernel, in a memory space in which the server deploys the OS; and
a poll list in which packet arrival information is to be registered, the packet arrival information being indicative of an arrival of a packet to the ring buffer,
wherein the server delay control device is configured to spawn a thread in the kernel, the thread configured to monitor a packet arrival according to a polling model, and
wherein the server delay control method comprises:
monitoring, by the thread, whether the packet arrival information has been registered in the poll list; and
when the packet arrival information has been registered in the poll list, dequeuing the packet from the ring buffer on the basis of the packet arrival information,
wherein the OS is a Host OS on which a virtual machine and an external process formed outside the virtual machine can operate,
wherein the Host OS further comprises a Test Access Point (TAP) device, which is a virtual interface created by the kernel, and
wherein a software interrupt operation is eliminated in the server delay control device.

4. A non-transitory computer-readable medium storing a computer program of a server delay control device deployed in a kernel of an operating system (OS) of a server implemented using a computer comprising one or more hardware processors,
wherein the OS comprises:
the kernel;
a ring buffer managed by the kernel, in a memory space in which the server deploys the OS; and
a poll list in which packet arrival information is to be registered, the packet arrival information being indicative of an arrival of a packet to the ring buffer,
wherein the server delay control device is configured to spawn a thread in the kernel, the kernel configured to monitor a packet arrival according to a polling model, and
wherein the computer program causes the computer to perform:
monitoring, by the thread, whether the packet arrival information has been registered in the poll list; and
when the packet arrival information has been registered in the poll list, dequeuing the packet from the ring buffer on the basis of the packet arrival information,
wherein the OS is a Host OS on which a virtual machine and an external process formed outside the virtual machine can operate,
wherein the Host OS further comprises a Test Access Point (TAP) device, which is a virtual interface created by the kernel, and
wherein a software interrupt operation is eliminated in the server delay control device.

5. A device comprising: computing hardware comprising one or more hardware processors; and an operating system (OS) implemented on the computing hardware and comprising a kernel,
wherein the kernel comprises:
a ring buffer for storing arrived packets;
a packet arrival monitoring part configured to monitor packet arrivals to the ring buffer according to a polling model; and
a packet reception processing part configured to, when an arrival of a packet to the ring buffer is detected by the packet arrival monitoring part, retrieve, from the ring buffer, the packet whose arrival to the ring buffer is detected,
wherein the kernel is configured to spawn, in the kernel, a thread from which the packet arrival monitoring part monitors the packet arrivals to the ring buffer,
wherein the OS is a Host OS on which a virtual machine and an external process formed outside the virtual machine can operate,
wherein the Host OS further comprises a Test Access Point (TAP) device, which is a virtual interface created by the kernel, and
wherein a software interrupt operation is eliminated in the device.

6. The device according to claim 5,
wherein the kernel further comprises a poll list in which packet arrival information is to be registered, the packet arrival information being indicative of an arrival of a packet to the ring buffer, and
wherein the packet arrival monitoring part is configured to monitor the poll list to monitor the packet arrivals to the ring buffer according to the polling model.

7. The device according to claim 5,
wherein the kernel is configured to allocate CPUs to the thread such that a number of the CPUs is varied according to an amount of incoming packets.

8. The device according to claim 5,
wherein the kernel is configured to, in the thread, analyze a content of the packet retrieved from the ring buffer and assign processing to a subsequent part in a manner depending on a type of the packet retrieved from the ring buffer.

9. The device according to claim 5,
wherein the kernel further comprises a patch that is capable of changing a processing operation of the kernel while running the kernel in a state of having been started.

10. A device control method to be executed by a device comprising: computing hardware comprising one or more hardware processors; and an operating system (OS) implemented on the computing hardware and comprising a kernel, the kernel comprising a ring buffer for storing arrived packets, the device control method comprising steps of:

spawning a thread in the kernel;

monitoring, from the thread, packet arrivals to the ring buffer according to a polling model; and when an arrival of a packet to the ring buffer is detected, retrieving, from the ring buffer, the packet whose arrival to the ring buffer is detected, wherein the OS is a Host OS on which a virtual machine and an external process formed outside the virtual machine can operate, wherein the Host OS further comprises a Test Access Point (TAP) device, which is a virtual interface created by the kernel, and wherein a software interrupt operation is eliminated from the device control method.

11. A non-transitory computer-readable medium storing a computer program of a device comprising: computing hardware comprising one or more hardware processors; and an operating system (OS) implemented on the computing hardware and comprising a kernel, the kernel comprising a ring buffer for storing arrived packets, wherein the computer program causes the device to perform:

spawning a thread in the kernel;

monitoring, from the thread, packet arrivals to the ring buffer according to a polling model; and when an arrival of a packet to the ring buffer is detected, retrieving, from the ring buffer, the packet whose arrival to the ring buffer is detected, wherein the OS is a Host OS on which a virtual machine and an external process formed outside the virtual machine can operate, wherein the Host OS further comprises a Test Access Point (TAP) device, which is a virtual interface created by the kernel, and wherein a software interrupt operation is eliminated in the device.

12. A device comprising: computing hardware comprising one or more hardware processors; and a Host operating system (OS) implemented on the computing hardware, on which Host OS a virtual machine and an external process formed outside the virtual machine can operate, wherein the Host OS comprises:

a kernel;

a ring buffer for storing arrived packets, wherein the ring buffer is managed by the kernel, in a memory space in which the Host OS is deployed;

a packet arrival monitoring part configured to, from a thread started in the kernel, monitor packet arrivals to the ring buffer according to a polling model; and a packet reception processing part configured to, when an arrival of a packet to the ring buffer is detected by the packet arrival monitoring part, retrieve, from the ring buffer, the packet whose arrival to the ring buffer is detected, wherein the Host OS further comprises a Test Access Point (TAP) device, which is a virtual interface created by the kernel, and wherein a software interrupt operation is eliminated in the device.

\* \* \* \* \*